Jan. 29, 1952 W. W. PRICKETT 2,583,707
ARTICLE HANDLING APPARATUS
Filed July 15, 1949 5 Sheets-Sheet 1

Inventor
Wilber W. Prickett

By Clarence A. O'Brien
and Harvey B. Jacobson
Attorneys

Jan. 29, 1952 W. W. PRICKETT 2,583,707
ARTICLE HANDLING APPARATUS
Filed July 15, 1949 5 Sheets-Sheet 2

Inventor
Wilber W. Prickett
By Clarence A. O'Brien
and Harvey B. Jacobson
Attorneys

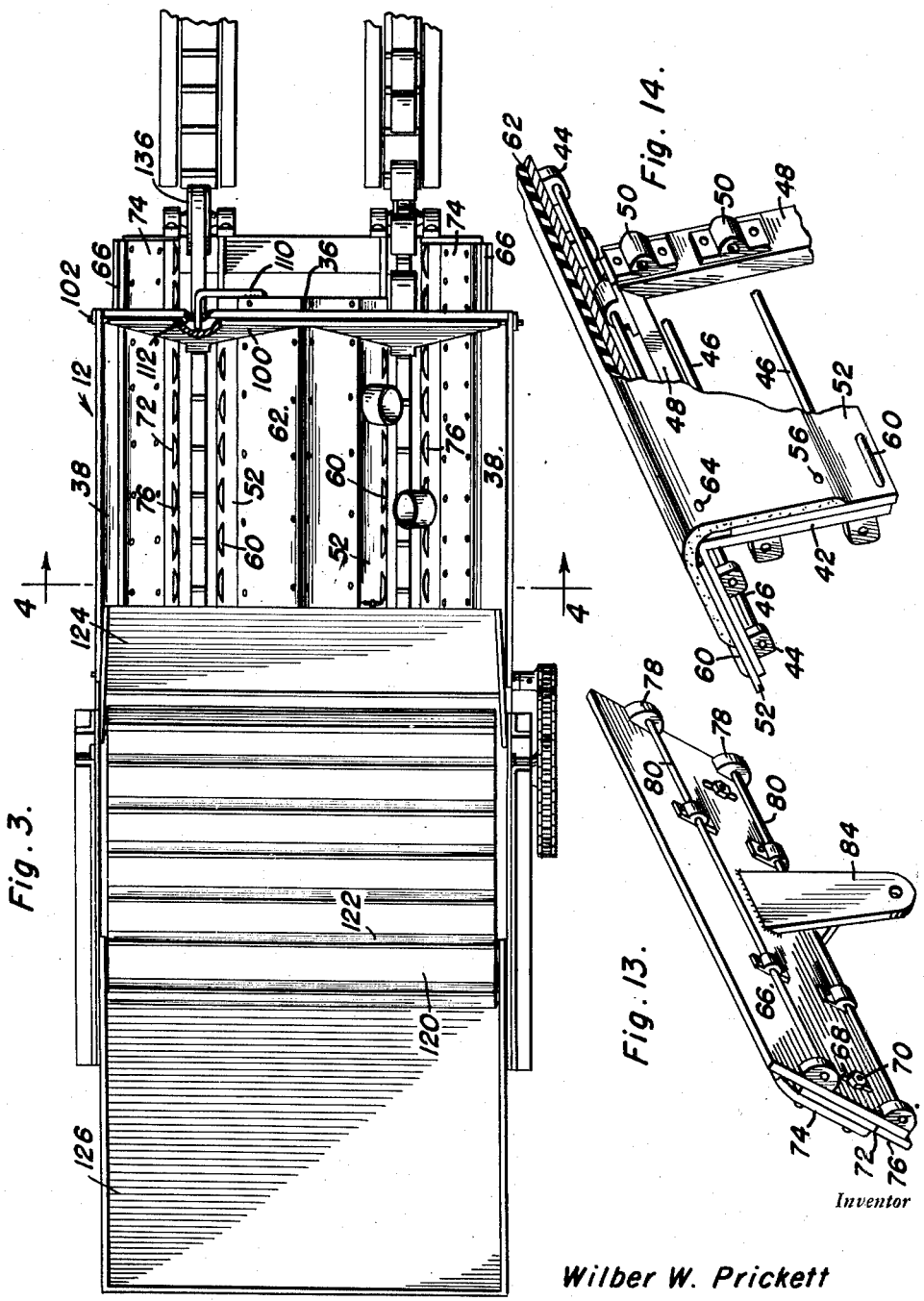

Jan. 29, 1952 W. W. PRICKETT 2,583,707
ARTICLE HANDLING APPARATUS
Filed July 15, 1949 5 Sheets-Sheet 4

Inventor
Wilber W. Prickett

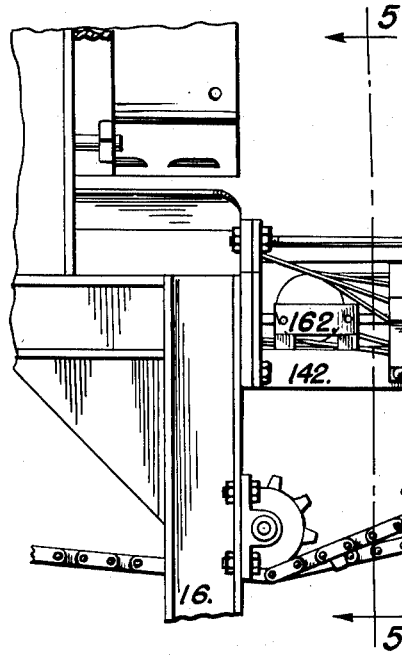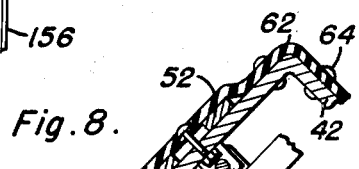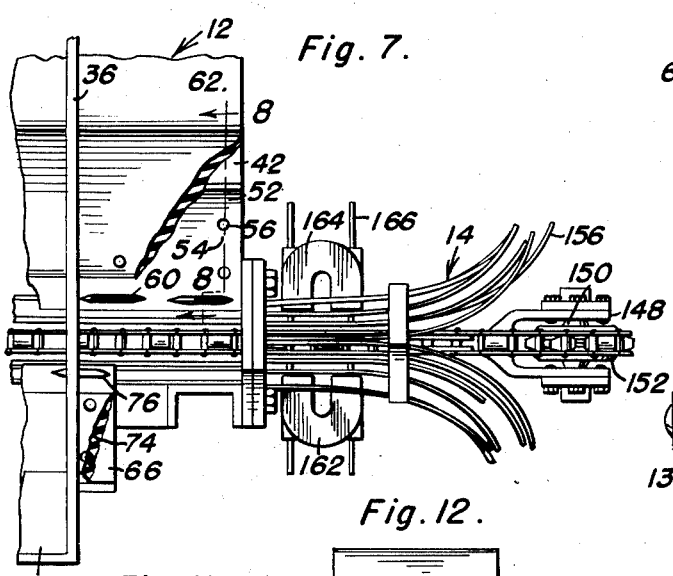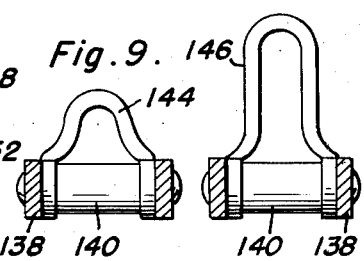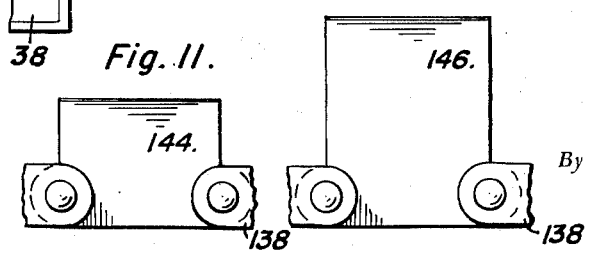
Inventor
Wilber W. Prickett
Attorneys Patented Jan. 29, 1952

2,583,707

UNITED STATES PATENT OFFICE 2,583,707

ARTICLE HANDLING APPARATUS

Wilber W. Prickett, San Diego, Calif., assignor to High Seas Tuna Packing Co., Inc., San Diego, Calif., a corporation of California Application July 15, 1949, Serial No. 104,848

10 Claims. (Cl. 198—30)

This invention relates to new and useful improvements in article handling apparatus and more particularly to a can positioning and feeding machine.

The primary object of the present invention is to provide a can positioning and feeding machine including a novel and improved shaker mechanism whereby cans may be placed, in a substantially horizontal position, upon a conveyor prior to the filling and labeling of the cans.

Another very important object of the present invention is to provide a shaker mechanism for can positioning and feeding machines consisting of a reciprocating shaker member disposed within a hopper and a pair of swingable can agitator plates that are actuated during reciprocatory movement of the shaker member to prevent the bunching up of cans acted upon by the shaker member.

Yet another object of the present invention is to provide a can positioning and feeding machine including guide chutes, a conveyor for conducting cans toward the guide chutes, a means for lifting cans from the conveyor and a means for directing cans into the guide chutes after the cans have been lifted from the conveyor.

A further object of the present invention is the provision of a can positioning and feeding machine consisting of a hopper, a pair of downwardly and inwardly inclined sliding members disposed within the hopper and spaced to permit a can to pass therebetween, and slidable and adjustable plates supported on one of the members for varying the space between the members.

A still further aim of the present invention is to provide a can positioning and feeding machine that is small and compact in structure, strong and durable in use, efficient and reliable in operation, simple and practical in construction, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 3 is a top plane view of Figure 1;

Figure 6 is an enlarged fragmentary side elevational view of the present invention and showing the guide attachment applied thereto;

Figure 7 is a top plan view of Figure 6 and with parts of the shaker cushioning pads broken away;

Figure 8 is an enlarged vertical sectional view taken substantially on the plane of section line 8—8 of Figure 7;

Figure 9 is an enlarged transverse vertical sectional view of the conveyor chain used in conjunction with the present invention and showing one of the low link brackets;

Figure 10 is an enlarged transverse vertical sectional view of the conveyor chain used in conjunction with the present invention and showing one of the high link brackets;

Figure 11 is a side elevational view of Figure 9;

Figure 12 is a side elevational view of Figure 10;

Figure 13 is a perspective view of one of the shaker plates used in conjunction with the present invention;

Figure 1:
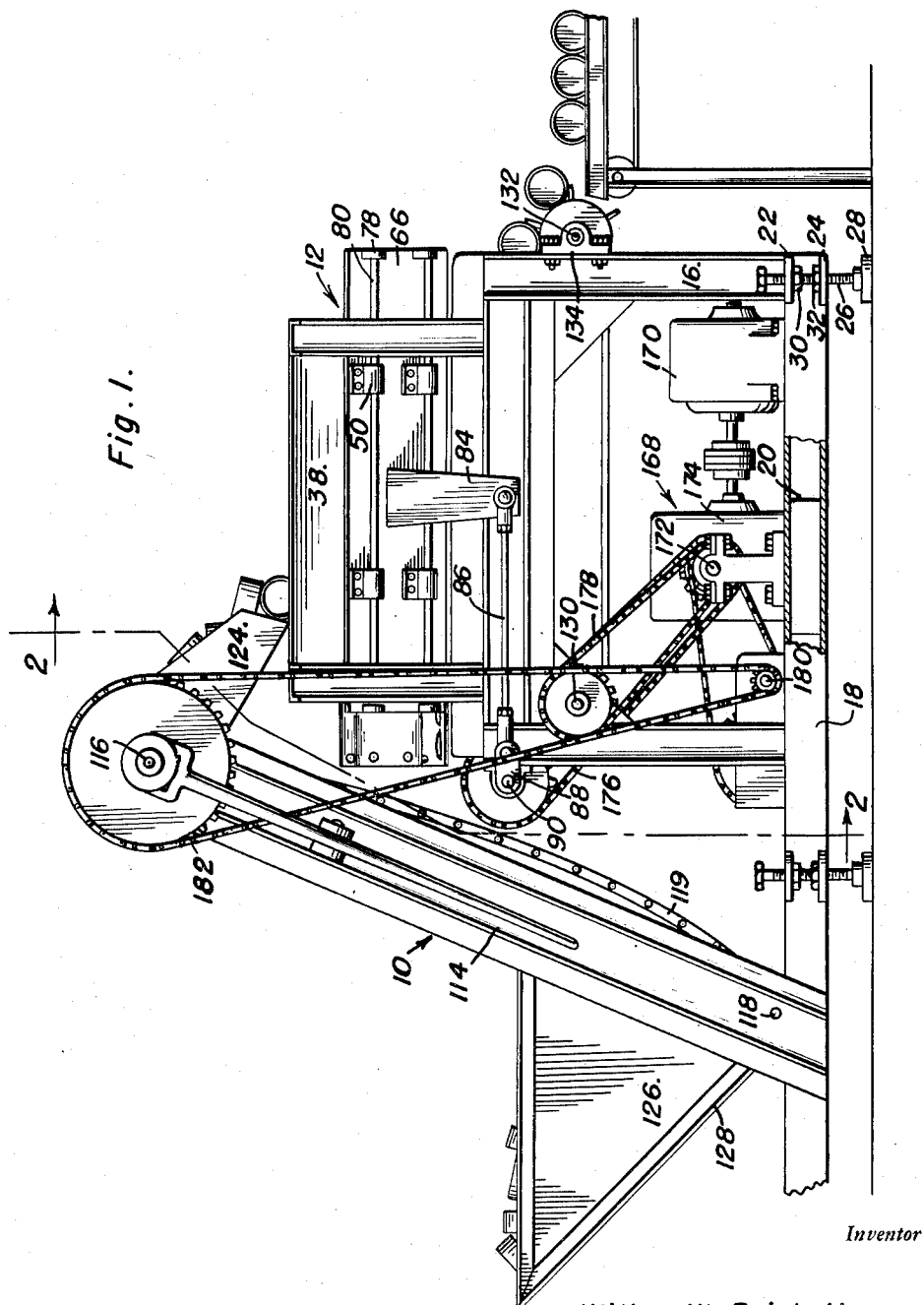
Figure 1 is a side elevational view of the present invention set up for feeding can horizontally.
Figure 2:
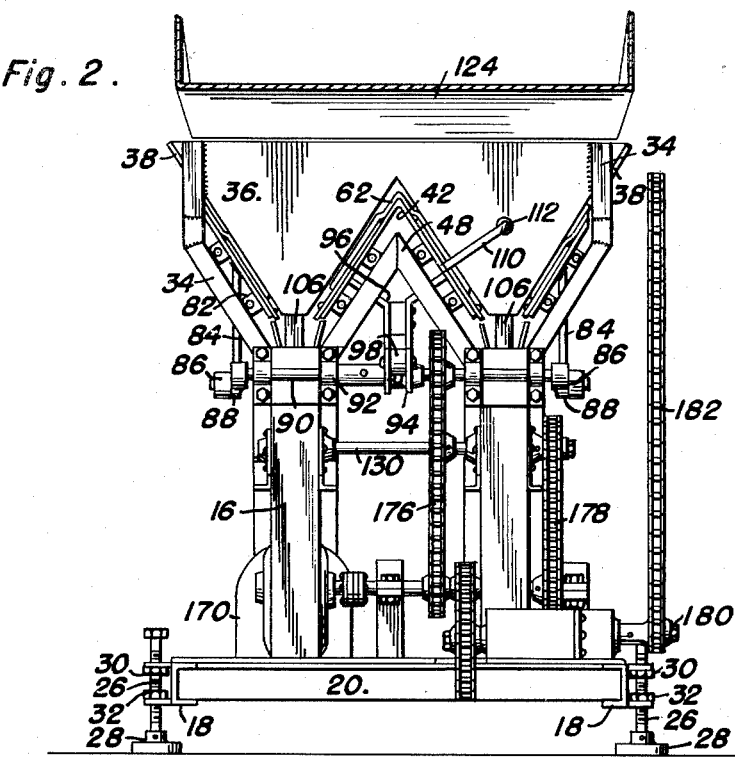
Figure 2 is a transverse vertical sectional view taken substantially on the plane of section line 2—2 of Figure 1.
Figure 15:
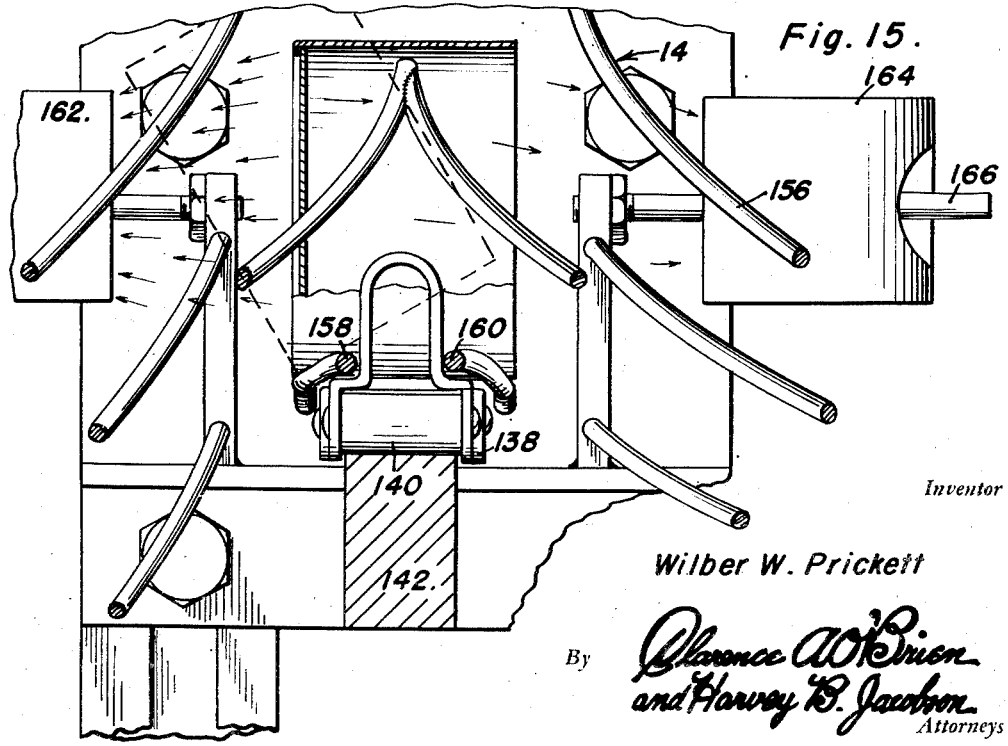

Figure 14 is a perspective view of the V-shaped shaker member used in conjunction with the present invention and with parts broken away and shown in section; and, Figure 15 is an enlarged transverse vertical sectional view showing the manner in which the cans are lifted from the chain conveyor and directed toward the guide chutes; and with parts of one can broken away for the convenience of explanation.

Referring now to the drawings in detail, wherein for the purpose of illustration, there is disclosed a preferred embodiment of the present invention, the numerals 10, 12 and 14 represent the lifting conveyor, the shaking mechanism, and the guide attachment that are used in conjunction with the present invention.

Shaker mechanism

The shaker mechanism 12 includes a supporting frame or framework 16, preferably of channel-iron or angle-iron construction. The frame 16 is provided with a pair of elongated side channel members 18 that receive the side edges of a substantially rectangular platform 20. Upper and lower pairs of ears 22 and 24 project laterally from the side channel members 18 and receive threaded rods or supporting posts 26 having bearing pads or feet 28 at their lower ends.

Upper and lower pairs of lock nuts 30 and 32 are threaded on each of the supporting posts 26 and bear against the lower faces of the ears 22 and the upper faces of the ears 24, respectively, to retain the posts 26 adjusted perpendicular to the side channel members 18 and the platform elevated.

A shaker hopper is supported upon the frame 16 and more particularly arms 34 rising from the frame 16. The arms 34 are secured by welding or the like to the spaced parallel side walls 36 of the shaker hopper. The shaker hopper includes, in addition to the side walls 36, a pair of downwardly and inwardly inclined end walls 38.

The side walls 36 are provided at their central portions with inverted substantially V-shaped openings 40 that receive an inverted substantially V-shaped sliding or reciprocating member 42 having downwardly diverging leg portions to the inner faces of which there is secured ears 44 supporting parallel bars 46.

Inverted V-shaped end supports 48 rise from the frame 16 and are received within the openings 40. The leg portions of the end supports 48 carry guide sleeves or bearings 50 that slidably receive the bars 46. Slidable and adjustable plates 52 rest upon the outer surfaces of the leg portions of the V-shaped member 42 and are provided with transverse slots 54 that receive bolts 56. The bolts 56 extend through the leg portions of the V-shaped member 42 and receivably engage nuts 58 for adjustment of plates 52 laterally of the V-shaped member 42.

Longitudinally spaced ribs 60 are pressed upwardly from the plates 52 and have a function that will later be more fully described.

A flexible, resilient, cushioning pad 62 overlies the plates 52 and is secured to the member 42 by rivets or fasteners 64 whereas the bolts 56 are employed for securing the pad 62 to the plates 52. The lower edges of the pad 62 terminate adjacent and above the ribs 60 so as not to obstruct the ribs 60 from contacting cans placed in the shaker hopper.

Sliding end plates or shaker plates 66 underlie the end walls 38 and are provided with transverse slots 68 that receive fasteners 70. The fasteners 70 slidably and adjustably secure bearing plates 72 to the upper and inner surfaces of the shaker plates 66. These fasteners (70) also secure resilient cushioning pads 74 to the outer faces of the plates 72. Longitudinally spaced ribs 76 are pressed upwardly from the plates 72 and are spaced below the lower edges of the pads 74.

Ears 78 are fixed to and project laterally from the outer faces of the shaker plates 66 and support parallel guide rods or bars 80 that are slidably received in guide sleeves or bearings 82 mounted on the arms 34. Although the shaker plates 66 are disposed beneath the end walls 38, the same slope downwardly and inwardly of the end plates to expose a large portion of the pads 74 and the plates 72.

Arms 84 depend from the shaker plates 66 and are pivotally connected to the rear ends of pusher links 86. The forward ends of the pusher links are pivoted to links 88 projecting laterally from the ends of a driven shaft 90. The shaft 90 is journaled in bearings 92 mounted on the forward portion of the frame 16 and the central portion of the shaft 90 supports a pair of laterally projecting ears 94 that are disposed on a diametrically opposite side of the shaft 90 from the links 88.

Further arms 96 depend from the member 42 and are secured to the ears 94 by a pitman 98 so that during rotation of the shaft 90 and as the shaker plates 66 move forwardly, the member 42 will move rearwardly, and, as the member 42 moves forwardly the shaker plates 66 will move rearwardly to accomplish the desired shaking action of cans placed in the shaker hopper.

Figure 4:
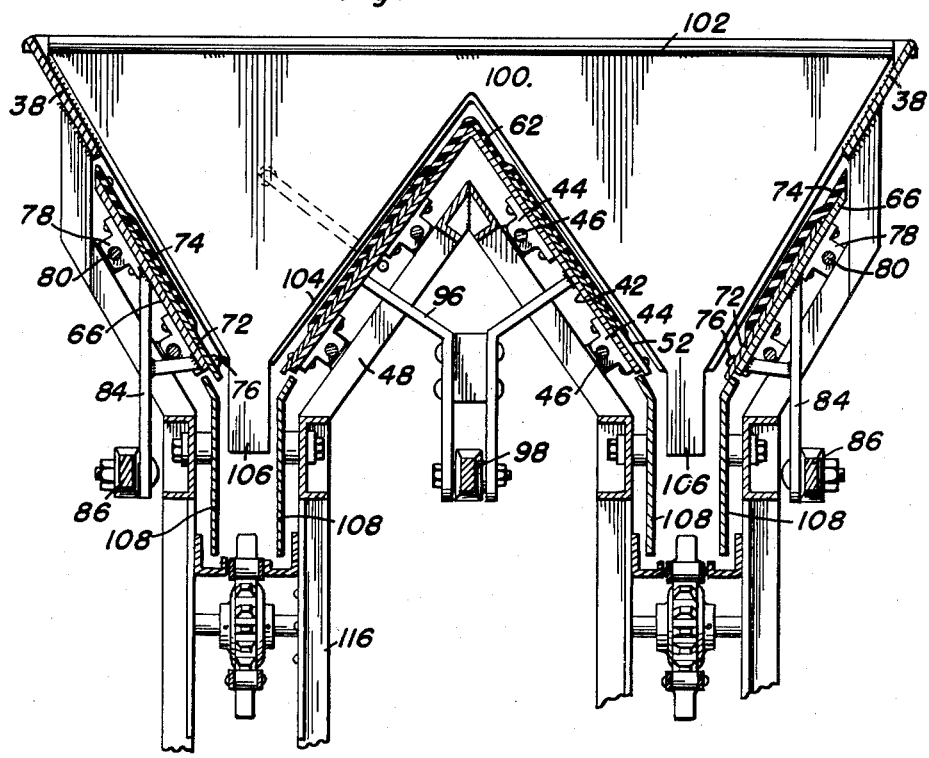
Figure 4 is an enlarged transverse vertical sectional view taken substantially on the plane of section line 4—4 of Figure 3.
Figure 5:
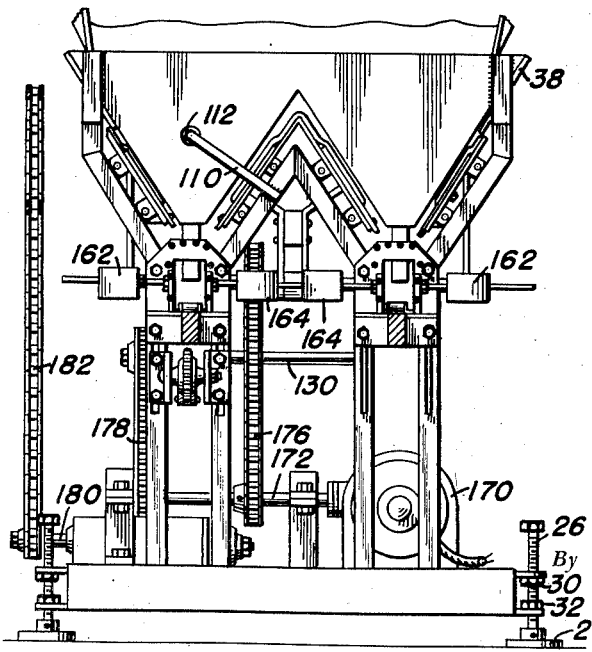
Figure 5 is a reduced vertical sectional view taken substantially on the plane of section line 5—5 of Figure 6.

Agitating means is associated with the shaker hopper and this means consists of a pair of swinging members or plates 100. Pivot rods 102 are fixed to the swinging members 100 and the ends of the pivot rods 102 are journaled in opening provided in the end walls 38 of the shaker hopper. The central portions of the plates 100 are provided with central V-shaped recesses or notches 104 to receive and permit sliding movement of the member 42. Contact plates 106 depend from the swinging members 100 and extend downwardly through the space between the shaker plates and the member 42. (See Figure 4.)

Pairs of vertically disposed, spaced parallel guide plates 108 are mounted on the frame 16 and the contact plates 106 are received between the pairs of guide plates.

Means is provided for imparting a swinging movement to the members 100 alternately. This means comprises a pair of substantially U-shaped actuating members 110. One leg of one of the members 110 is secured to one end of the sliding member 42 and one end of the other actuating member 110 is secured to the other end of the member 42. The unattached legs of the members 110 are slidably received in openings 112 provided in the side walls of the shaker hopper so that as the member 42 moves in one direction one of the members 100 will pivot or swing and as the member 42 moves in an opposite direction the other of the members 100 will pivot or swing.

*Lifting conveyor*

The lifting conveyor 10 is supported upon the side channel members 18 and includes a pair of upwardly and rearwardly inclined side portions 114 that rotatably support upper and lower sprocket holding shafts 116 and 118. Endless sprocket chains 119 are trained about sprockets on the shafts 116 and 118 and spaced parallel cleats 122 are terminally secured to the chains 119 for supporting and lifting cans. The chains 119 are guided in suitable channels on the side portions 114 and the cleats 122 ride upon an upwardly inclined support wall 120.

A downwardly and rearwardly inclined trough or guide panel 124 is supported on the upper ends of the side portions 114 and extends over the shaker hopper so that as cans are lifted by the cleats 122 and chains 119, the cans will gravitate down the guide panel 124 to enter the shaker hopper.

A main hopper or dump bin 126 is supported on the lower ends of the side portions 114 and its rear is open so that cans placed on the downwardly and rearwardly inclined bottom wall 128 of the hopper 126 will slide against the cleats 122 to be lifted by the chains 119 and the cleats 122.

*Conveyor for cans leaving the shaker mechanism*

Forward and rear pairs of horizontally disposed shafts 130 and 132 are journaled in suitable bearings, such as 134, mounted on the frame 16. The shafts 130 and 132 carry sprockets 136 and endless chains 138 are trained over the sprockets 136. The upper flights of the chains 138 are received between the pairs of plates 108.

The chains 138 support rollers 140 that ride upon guide beams 142 mounted on the rear of the frame 16. The chains 138 are provided with high and low link members or contact fingers 144 and 146, there being a predetermined number of the link members 144 between adjacent pair of link members 146.

The beams 142 are provided with bifurcated rear end portions 148 that supports shafts 150 carrying sprockets 152. In order to space the cans delivered by the chains 138 into two piles, one of the beams 142 extends rearwardly past the other beam 142, as shown in Figure 6, the longer of the two beams being designated by the numeral 154.

Guide attachment

A guide attachment 14 is associated with each of the endless conveyor belts or chains 138. These guide attachments include arcuate guide chutes of bendable rods 156 that are arranged to turn cans from their horizontal position on the conveyor chains 138 to a vertical position.

The above described guide attachment is described fully in the patent to A. H. Nelson, numbered, 1,886,896 issued November 8, 1932. However the instant structure anticipates additional elements, namely, twisted rods 158 and 160 upon which the cans will be lifted and pairs of magnets 162 and 164 that are adjustable upon support rods 166 mounted on the attachments 14. The magnets 162 and 164 are so arranged as to attract the bottom walls of the cans after the cans have been raised upon the rods 158 and 160 whereupon the cans will pass into the twisted portion of a selected guide unit to slide downwardly until the bottom walls of the cans rest upon a suitable support or conveyor.

Power means

In order to drive the conveyor belt 120, reciprocate the shaker plates 66 and shaker member 42, and drive the conveyor chains 138, there is provided a power means 168 including a motor 170. The motor 170 includes a drive shaft that is secured to a first driven shaft 172 through gears (not shown) mounted in a gear housing 174.

A first driving connection 176 extends between the shaft 90 and the shaft 172 and a second driving connection 178 is provided between the shaft 172 and the shaft 130.

The shaft 116 is connected to a shaft 180, driven by the shaft 172, by a drive connection 182. Any suitable brake means or clutch means is associated with the power means so that the chains 119 can be prevented from rotating or whereby the various parts can be operated individually or collectively.

It should be noted, that the rounded tops of the low links is to cause the cans (while riding in vertical position) to be more easily overbalanced than would prevail if the cans were riding on flat links. The high links are spaced wide enough apart to keep the rims of the cans from interlocking with each other and thereby causing the cans to drag the adjoining cans the wrong way.

The magnets are placed at the exit of members 108 so that as soon as a can enters the exit the can is drawn off balance by the magnets and the can will continue to ride the lug or link chain 138 until the can comes in contact with members 158 and 160 which will lift the edge of the can from contact with the chain 138, and the can will slide down the chute, open end up. The humps in the bars 158 and 160 help to set a can right side up as the can following pushes it down the slide.

Having described the invention, what is claimed as new is:

1. In a can positioning and feeding machine a can shaking and agitating mechanism, said can shaking and agitating mechanism comprising a shaker hopper having a pair of slidable end walls, said end walls inclining downwardly and inwardly, an inverted V-shaped member interposed between said end walls and having downwardly inclined leg portions sloping toward the respective end walls, means for reciprocating the end walls and the V-shaped member, and swingable agitating members mounted in the hopper and actuated during sliding movement of the V-shaped member.

2. In a can positioning and feeding machine, a can shaking mechanism, said mechanism comprising a supporting frame, a shaker hopper mounted on the frame and including a pair of side walls and a pair of downwardly and inwardly inclined end walls, said side walls having inverted substantially V-shaped openings therein, a V-shaped member slidably received in said openings, a pair of slidable plates underlying said end walls and extending below the end walls and toward the V-shaped member, the plates being spaced from the V-shaped member to provide can receiving spaces, a common means for reciprocating the plates and the V-shaped member, and agitating means disposed within the hopper and actuated by the V-shaped member.

3. In a can positioning and feeding machine, a can shaking mechanism, said mechanism comprising a supporting frame, a hopper mounted on the frame and including a pair of side walls and a pair of downwardly and inwardly inclined end walls, said side walls having inverted substantially V-shaped openings therein, a V-shaped member slidably received in said openings, a pair of slidable plates underlying said end walls and extending below the end walls and toward the V-shaped member, the plates being spaced from the V-shaped member to provide can receiving spaces, a common means for reciprocating the plates and the V-shaped member, a pair of swinging members mounted in said hopper and pivotally supported on the end walls, and means carried by the V-shaped member and slidably supported on the side walls for engaging and imparting a swinging movement to the swinging members during reciprocatory movement of said V-shaped member.

4. The combination of claim 3 and cushioning pads of resilient material secured to the V-shaped member.

5. The combination of claim 3 and adjusting plates slidably and adjustably secured to the V-shaped member for adjusting the can receiving spaces to a predetermined area.

6. A shaking mechanism for cans comprising a shaker hopper including a pair of slidable end walls, an inverted V-shaped member mounted in said hopper for reciprocation, means connected to the end walls and the V-shaped member for imparting sliding movement thereto, and means swingably mounted in said hopper and actuated by said member for agitating cans placed in the hopper.

7. A shaking mechanism for cans comprising a shaker hopper including a pair of slidable end walls, an inverted V-shaped member mounted in said hopper for reciprocation, means connected to the end walls and the V-shaped member for imparting sliding movement thereto, a pair of swingable can-agitating plates mounted in said hopper, and means supported on said member engaging and imparting swinging movement to said plates during reciprocation of said member.

8. A shaking mechanism for cans comprising a shaker hopper including a pair of slidable end walls, an inverted V-shaped member mounted in said hopper for reciprocation, means connected to the end walls and the V-shaped member for imparting sliding movement thereto, a pair of swingable can-agitating plates mounted in the hopper at the ends of the member, and a pair of actuating members secured to and movable with the V-shaped member for alternately engaging and swinging the plates during reciprocation of said V-shaped member.

9. The combination of claim 1 wherein said agitating members include depending contacting plates extending between and below the end walls and the leg portions of said V-shaped member.

10. In a can positioning and feeding machine, a can shaking and agitating mechanism, said can shaking and agitating mechanism comprising a shaker hopper having a pair of slidable end walls, said end walls inclining downwardly and inwardly, an inverted V-shaped member interposed between said end walls ad having downwardly inclined leg portions sloping toward the respective end walls, means for reciprocating the end walls and the V-shaped member, and at least one swingable plate mounted in said hopper and actuated by said member for agitating cans placed in said hopper.

WILBER W. PRICKETT.

REFERENCES CITED

The following references are of record in the file of this patent:

UNITED STATES PATENTS

| Number | Name | Date |
|---|---|---|
| 553,315 | Packer | Jan. 21, 1896 |
| 1,495,610 | Paridon | May 27, 1924 |
| 1,886,896 | Nelson | Nov. 8, 1932 |
| 1,931,114 | Olney | Oct. 17, 1933 |
| 2,264,348 | Weygant | Dec. 2, 1941 |
| 2,333,576 | Kerr | Nov. 2, 1943 |
| 2,515,166 | Wadleigh | July 11, 1950 |